United States Patent
Kaplan

(10) Patent No.: US 7,714,698 B2
(45) Date of Patent: May 11, 2010

(54) RFID-UWB SYSTEM CONNECTED TO WLAN INFRASTRUCTURE

(75) Inventor: Gideon Kaplan, Kiryat Ono (IL)

(73) Assignee: Sandlinks Systems Ltd., Tel Aviv (IL)

( * ) Notice: Subject to any disclaimer, the term of this patent is extended or adjusted under 35 U.S.C. 154(b) by 267 days.

(21) Appl. No.: 11/997,745

(22) PCT Filed: Aug. 8, 2006

(86) PCT No.: PCT/IL2006/000916

§ 371 (c)(1),
(2), (4) Date: Feb. 3, 2008

(87) PCT Pub. No.: WO2007/017871

PCT Pub. Date: Feb. 15, 2007

(65) Prior Publication Data

US 2008/0224869 A1    Sep. 18, 2008

Related U.S. Application Data

(60) Provisional application No. 60/706,041, filed on Aug. 8, 2005.

(51) Int. Cl.
*H04Q 5/22* (2006.01)

(52) U.S. Cl. .................... 340/10.5; 340/572.1; 340/10.1

(58) Field of Classification Search ............. 340/572.1, 340/10.1, 505
See application file for complete search history.

(56) References Cited

U.S. PATENT DOCUMENTS

2007/0125836 A1* 6/2007 McAllister et al. .......... 235/375
2008/0297312 A1* 12/2008 Moshfeghi ................. 340/10.1

FOREIGN PATENT DOCUMENTS

| WO | WO03/098528 | 11/2003 |
| WO | WO2005/119924 | 12/2005 |

* cited by examiner

*Primary Examiner*—Travis R Hunnings
(74) *Attorney, Agent, or Firm*—Mark M. Friedman

(57) ABSTRACT

A system including a radio frequency identification (RFID) network and a wireless local area network (WLAN). The RFID network transfers ultra-wide band signals between a reader and a tag. In the wireless local area network (WLAN) an access point communicates with a WLAN transceiver using WLAN signals. The reader is operatively attached to either the wireless access point or the WLAN transceiver and the WLAN is a back haul network of the RFID network. Co-existence of the two networks is provided either by time division between the ultra-wide band signals and WLAN signals; and/or receiver isolation of said RFID network from said WLAN signals.

15 Claims, 8 Drawing Sheets

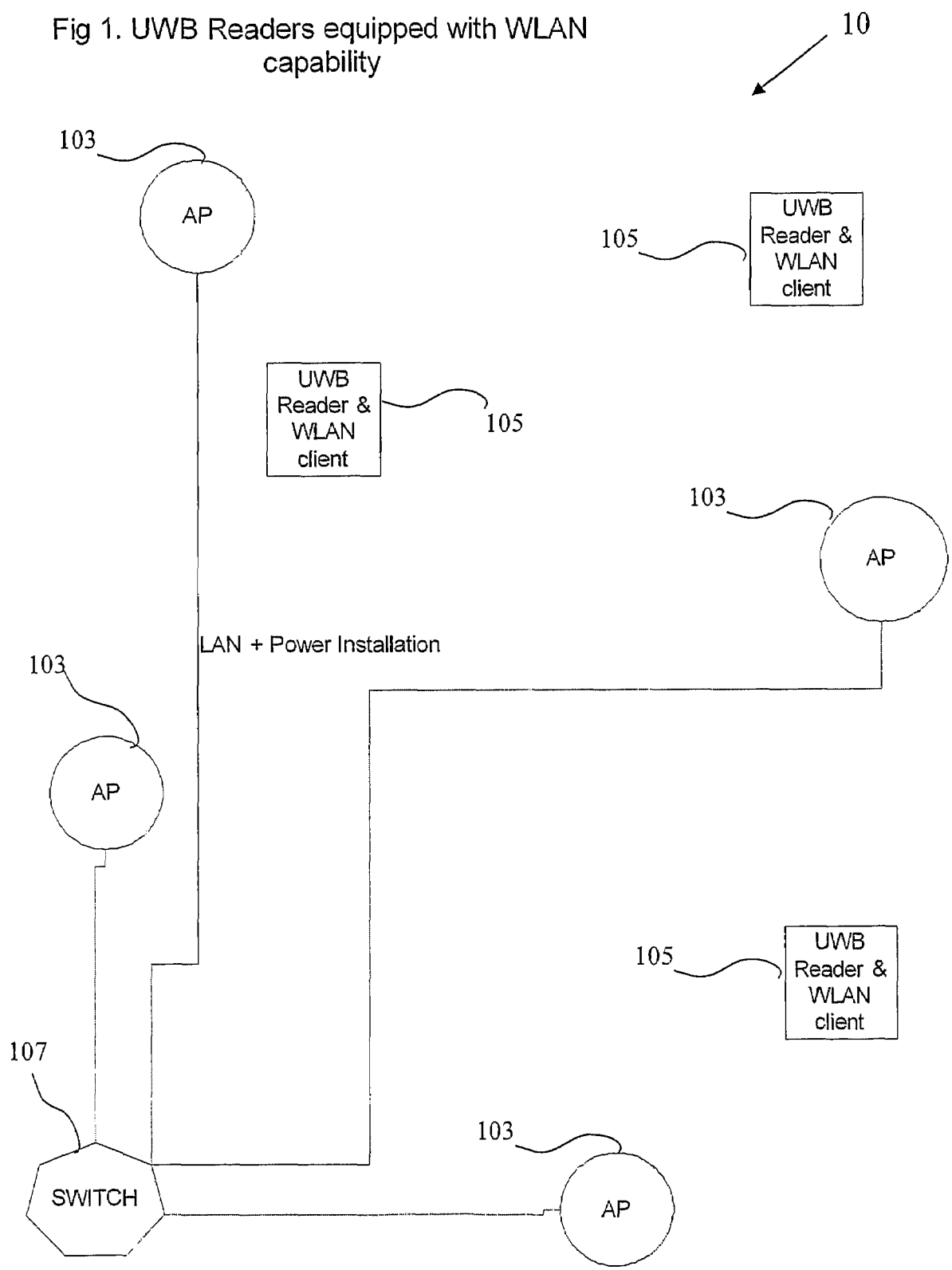

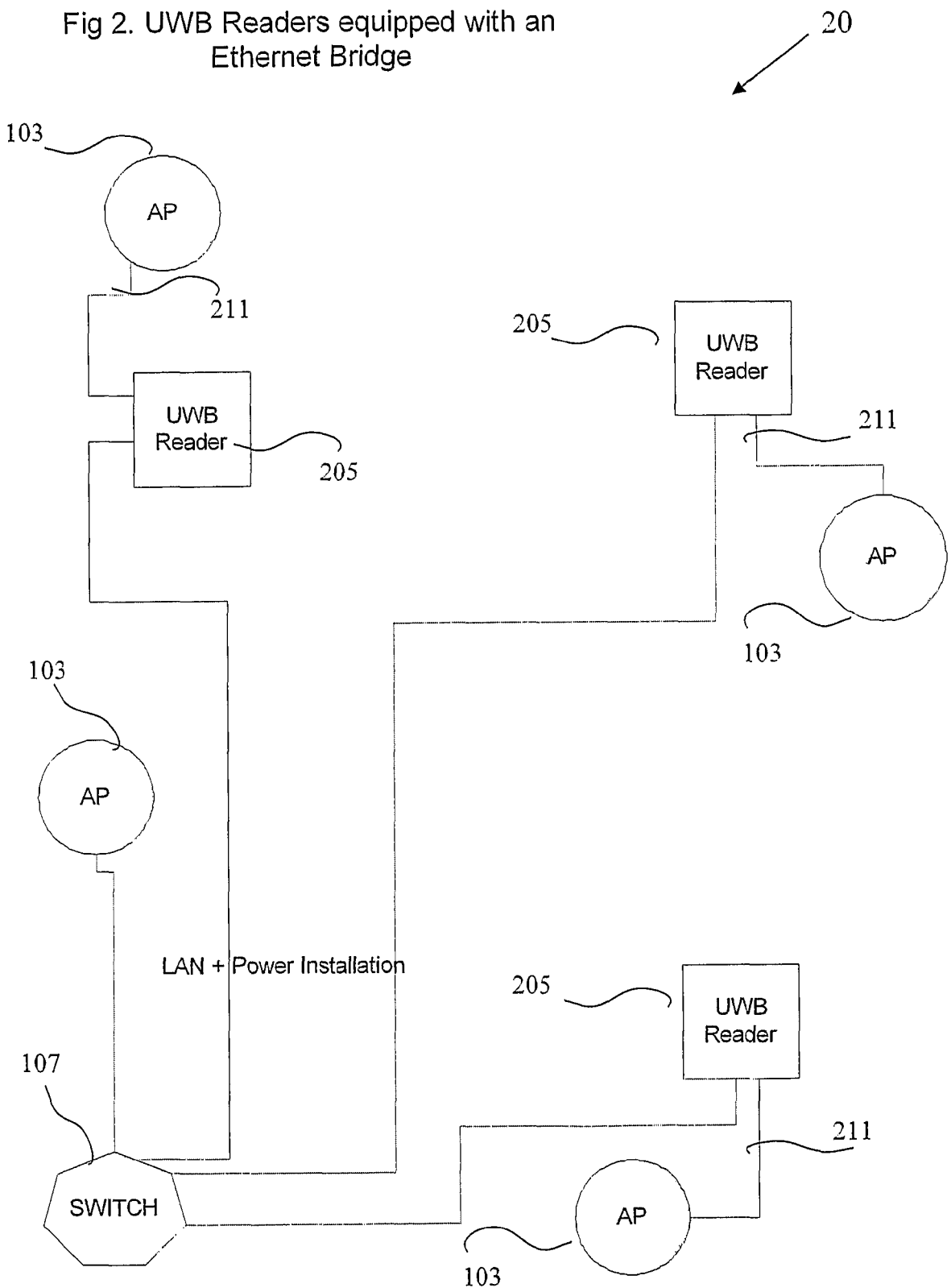

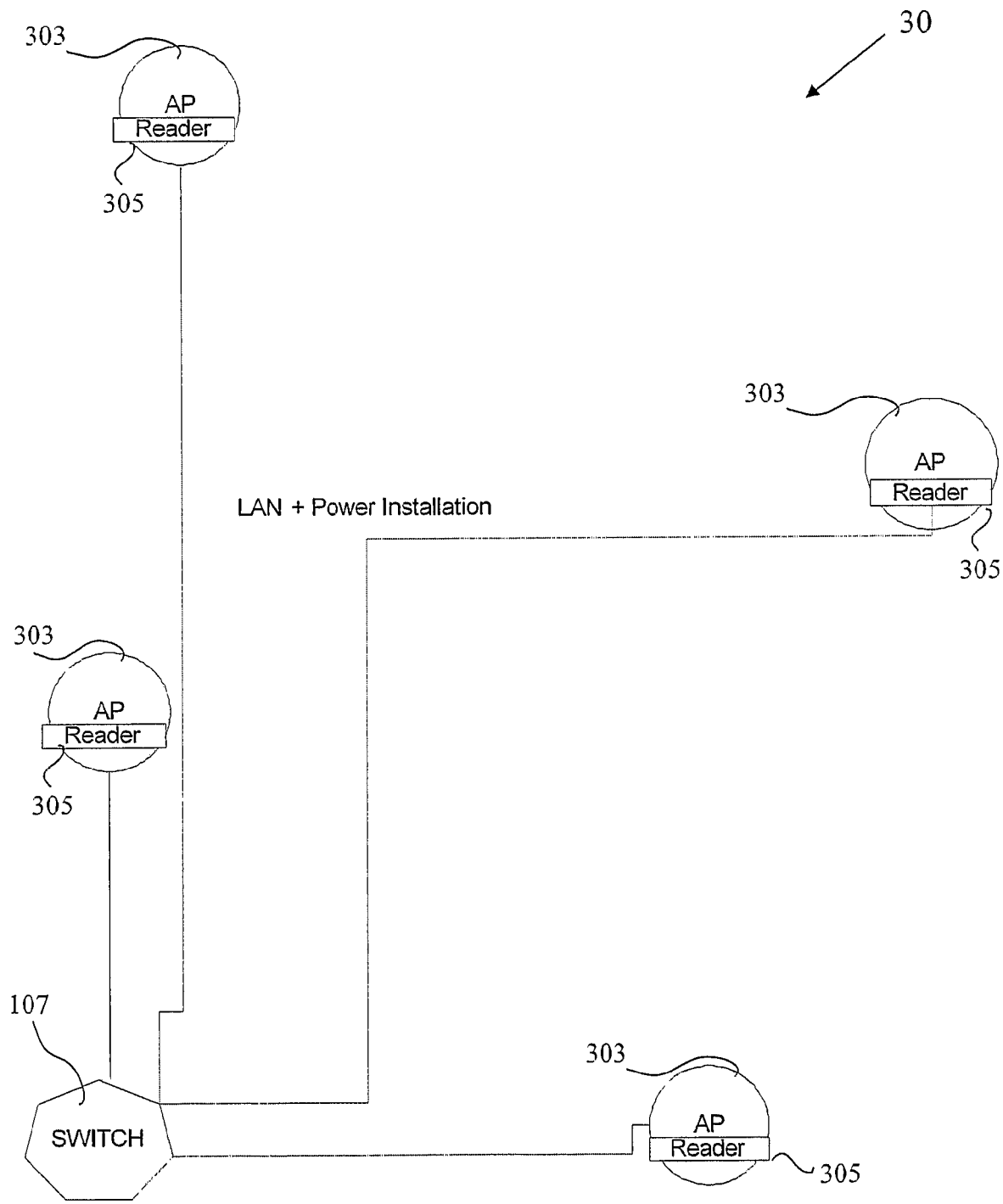
Fig. 3: Employing Aps with an expansion slot (which can be occupied by a Reader)

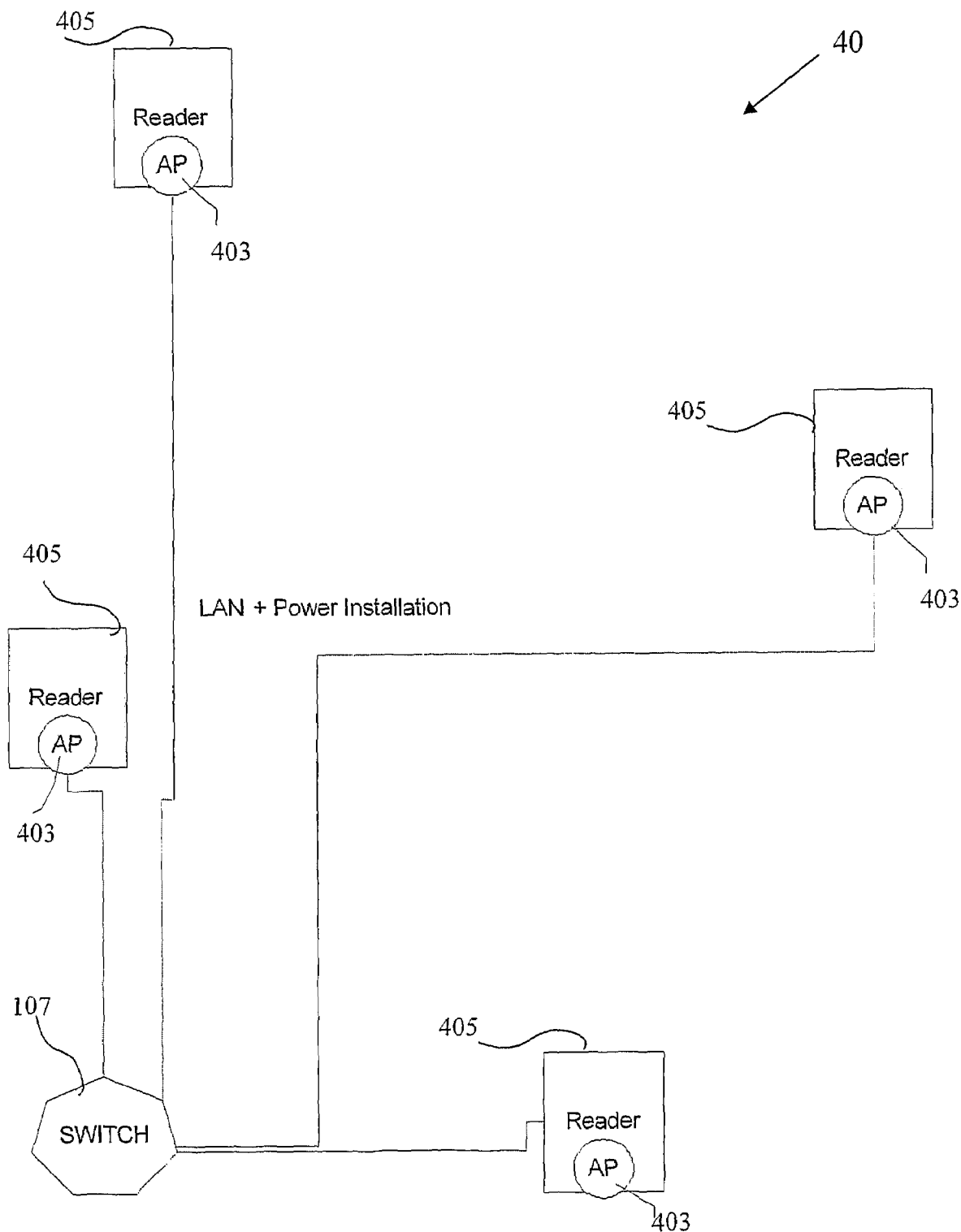

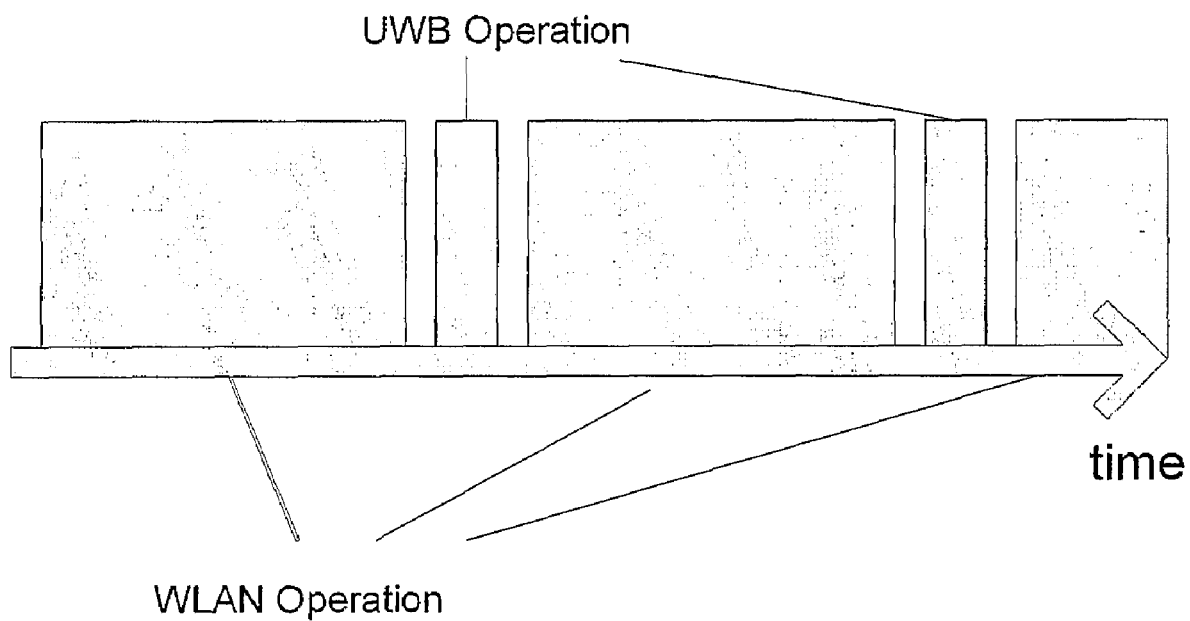
Fig. 5: Using the time domain to separate UWB-RFID and WLAN operation

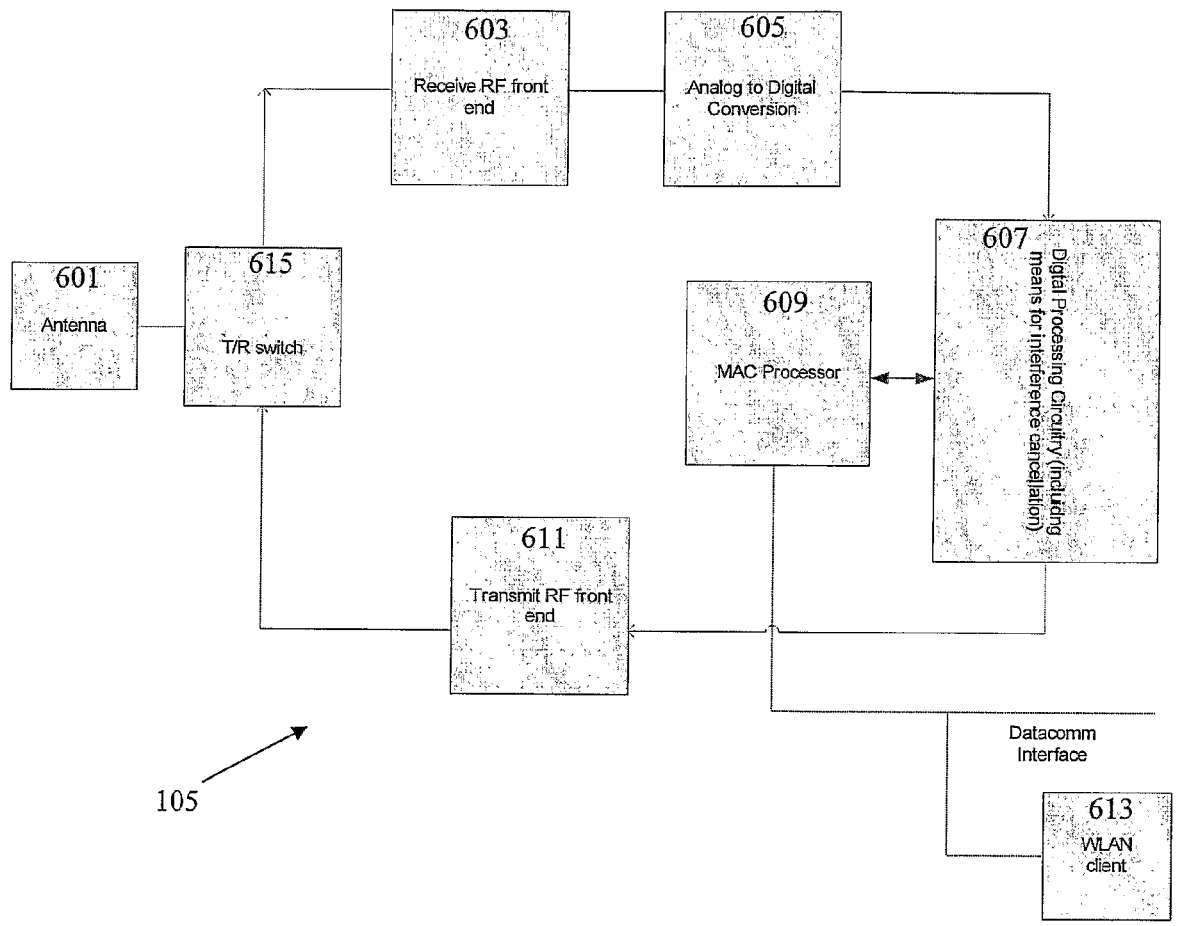
Figure 6 : A UWB Reader Block Diagram

RFID-UWB SYSTEM CONNECTED TO WLAN INFRASTRUCTURE

RELATED APPLICATION

This application claims the benefit from U.S. provisional application 60/706,041 filed 8 Aug. 2005 by the present inventor.

TECHNICAL FIELD

The present invention relates to an RFID system including readers and tags, using ultra-wide band (UWB) communications between the readers and the tags, and the RFID system coexists and transfers backhaul data with a wireless LAN operating in the same space without RF interference.

BACKGROUND ART

Radio Frequency IDentification (RFID) is a method of storing and remotely retrieving data using devices called RFID tags. An RFID tag is a small object that can be attached to a product, animal, or person. RFID tags receive and respond to radio-frequency queries from an RFID reader. RFID tags can be either active or passive Passive tags require no internal power source, whereas active tags require a power source. Active RFID tags have an internal power source, and typically have longer range and larger memories than passive tags.

An RFID system includes several components including mobile tags, tag readers, and application software. The RFID system enables a query to be received by the mobile tag and the tag responds with data. The data is received by an REID reader and processed according to the needs of a particular application. The data transmitted by the tag may provide identification or location information, or specifics about the product tagged, such as price, color, date of purchase.

RF identification (RFID) systems are used to track objects, animals and/or people in a large range of applications. As an example, RFID is used to track books in a library. Security gates includes an RF transceiver as part of the RFID reader which detects whether or not a book has been properly checked out of the library. When the book returns, the tag attached to the book is detected and an appropriate record is updated in the library system. In another application, RFID readers previously located in a warehouse are used to identify certain objects (for example, on a track entering the warehouse), or to find the location of certain objects, by communicating with their tags and measuring the position of their tags.

A RFID system employs tags on various objects and readers of the tags in a given space. The main function of an RFID is to enable identifying the objects and possibly reading and writing data of the objects to and from the respective tags. Often the RFID system allows tracking the location of the objects via the respective tag location.

In certain RFID applications, it is important to ascertain that the identified tag is located within a certain distance from the reader. For example, the identification of the tag may be required in order to open a door to an access-limited area. If a tag which is positioned remotely from the reader is identified by the reader, the door may be opened to an unauthorized individual. Limiting transmission range of the reader is not a potential solution to this problem because near the limit of the transmission range tags may not be identified for instance due to different tag orientations and/or on occlusion between the tag and reader. Ultra-wide band communications is particularly useful for determining distance and location of RFID tags. PCT International Patent Application Publication No. WO 2003/098528, (PCT Patent Application No. PCT/IL2003/00358), entitled "Method and system for distance determination of RF tags" is incorporated by reference for all purposes as if fully set forth herein. PCT/IL2003/00358 discloses an RFID system having the capability of automatically identifying unknown tags by sending a broadcast interrogation ultra wide-band (UWB) message signal and receiving responses from tags that receive the message signal.

As known in the art of RFID systems, the Readers are devices which identify and concentrate the data from the tags. An RFID system is a useful tool to obtain resource and location information for resource management applications. Resource management applications are typically run at least in part using computers connected over a LAN. As an example, an aircraft is being assembled in a hangar. Information regarding each part both before and after assembly is collected using an RFID system and the information is collected using a computer resource management (CRM) application running on computers interconnected within the hangar using a wired LAN. Use of a wireless LAN in the hangar may be limited because of mutual RF interference between the RFID (UWB) network and the wireless LAN.

Thus, there is a need for and it would be advantageous to have WLAN and RFID system based on ultra wide operating in the same space without interfering with each other so that portable computers interconnected with a wireless LAN may be operated in the same space as the RFID/UWB network.

In FIG. 7, a graph illustrates schematically different emitted signal power levels including an ultra-wide band signal, a spread spectrum WLAN (Institute of Electrical and Electronics Engineers, IEEE 802.11a) signal with bandwidth about 5 MHz, and a narrow band modulated signal of 30 kHz bandwidth. The noise floor of the spread spectrum WLAN signal is illustrated at about the peak signal level of the ultra-wide band signal indicating that the narrow band and spread spectrum WLAN communications should have little difficulty operating within specifications in the presence of UWB signals. However, an RFID system using ultra wide band signaling is susceptible to receive high signal levels (up to for instance 18 dbm) from a WLAN operating in the same vicinity as the RFID/UWB network.

The term "ultra-wide band" (UWB) as used herein is defined (by FCC and ITU-R) in terms of a transmission from an antenna for which the emitted signal bandwidth exceeds the lesser of 500 MHz or 20% center frequency. Ultra-wide band (UWB) communication technology employs discrete pulses of electromagnetic energy that are emitted at, for example, picosecond to microsecond intervals. For this reason, ultra-wide band is often called "impulse radio." A UWB pulse is a single electromagnetic burst of energy. A UWB pulse can be either a single positive burst of electromagnetic energy, or a single negative burst of electromagnetic energy, or a series of pulses. Each pulse in al pulse-based UWB system occupies the entire UWB bandwidth, e.g. 3.1 to 10.6 GHz. thus having relative immunity to multipath fading (but not to intersymbol interference), unlike carrier-based systems that are subject to both deep fades and intersymbol interference. Ref: http://en.wikipedia.org/wiki/Ultra_wide band.

WLANs are local area networks that employ high-frequency radio waves rather than wires to exchange information between devices. IEEE 802.11 refers to a family of WLAN standards developed by the IEEE. In general, WLANs in the IEEE 802.11 family provide for 1 or 2 Mbps transmission in the 2.4 GHz band or 5.2 Ghz band using either frequency hopping spread spectrum (FHSS) or direct sequence spread spectrum (DSSS) transmission techniques. IEEE 802.11b (also referred to as 802.11 High Rate or Wi-Fi) is an extension to IEEE 802.11 and provides for data rates of up to 11 Mbps in the 2.4 or 5 GHz band providing wireless functionality comparable to Ethernet. IEEE 802.11b employs only DSSS transmission techniques. IEEE 802.11g provides for data rates of up to 54 Mbps. For transmitting data at rates above 20 Mbps, IEEE 802.11g employs Orthogonal Frequency Division Multiplexing (OFDM) transmission.

In order to reduce the probability of two stations colliding on a receiver because they cannot hear each other, the IEEE 802.11 standard uses a Request to Send/Clear to Send (RTS/CTS) handshake. A station requiring to transmit a packet first transmits a short control packet called RTS (Request To Send), which includes the source, destination, and the duration of the following frame; the target station replies (if the medium is free) with a control packet called CTS (Clear to Send), which includes the same duration information. All stations receiving either the RTS and/or the CTS, refrain transmission for the given duration. This mechanism reduces the probability of a collision on the receiver area by a station that is "hidden" from the transmitter (and it does not hear the RTS), since the station hears the CTS and "reserves" the medium as busy until the end of the transmission. The duration information on the RTS also protects the transmitter area from collisions during the ACK (from stations that are out of range of the acknowledging station).

IEEE 802.11e as of late 2005 has been approved as a standard that defines a set of Quality of Service enhancements for LAN applications, in particular the 802.11 WiFi standard. The standard is considered of critical importance for delay-sensitive applications, such as Voice over Wireless IP and Streaming Multimedia. The protocol enhances the IEEE 802.11 Media Access Control (MAC) layer.

The basic 802.11 MAC layer uses the Distributed Coordination Function (DCF) to share the medium between multiple stations. DCF relies on Carrier Sense Multiple Access With Collision Avoidance (CSMA/CA) and optional 802.11 RTS/CTS to share the medium between stations.

The original 802.11 MAC defines another coordination function called the Point Coordination Function (PCF): this is available only in "infrastructure" mode, where stations are connected to the network through an Access Point (AP). Access points send "beacon" frames at regular intervals (usually every 0.1 second). Between these beacon frames, PCF defines two periods: the Contention Free Period (CFP) and the Contention Period (CP). In CP, the DCF is simply used. In CFP, the access point sends Contention Free-Poll (CF-Poll) packets to each station, one at a time, to give them the right to send a packet.

The 802.11e enhances the DCF and the PCF, through a new coordination function: the Hybrid Coordination Function (HCF). Within the HCF, there are two methods of channel access, similar to those defined in the legacy 802.11 MAC: HCF Controlled Channel Access (HCCA) and Enhanced DCF Channel Access (EDCA). Both EDCA and HCCA define Traffic Classes (TC). For example, emails could be assigned to a low priority class, and Voice over Wireless IP (VoWIP) could be assigned to a high priority class.

With EDCA, high priority traffic has a higher chance of being sent than low priority traffic: a station with high priority traffic waits a little less before it sends its packet, on average, than a station with low priority traffic. In addition, each priority level is assigned a Transmit Opportunity (TXOP). A TXOP is a bounded time interval during which a station can send as many frames as possible (as long as the duration of the transmissions does not extend beyond the maximum duration of the TXOP). If a frame is too large to be transmitted in a single TXOP, it should be fragmented into smaller frames. The use of TXOPs reduces the problem of low rate stations gaining an inordinate amount of channel time in the legacy 802.11 DCF MAC.

Wi-Fi Multimedia (WMM) certified APs must be enabled for EDCA and TXOP. All other enhancements of the 802.11e amendment are optional.

The HCCA functions similarly to PCF: the interval between two beacon frames is divided into two periods, the contention free period (CFP) and the contention period (CP). During the CFP, the Hybrid Coordinator (HC) e.g. the access point, controls the access to the medium. During the CP, all stations function in EDCA. The main difference with the PCF is that Traffic Classes (TC) are defined. The HC can coordinate the traffic in any fashion it chooses (not just round-robin). Moreover, the stations give info about the lengths of their queues for each Traffic Class (TC). The HC can use this info to give priority to one station over another. Another difference is that stations are given a TXOP: they may send multiple packets in a row, for a given time period selected by the HC. During the CP, the HC allows stations to send data by sending CF-Poll frames.

HCCA is generally considered the most advanced (and complex) coordination function. With the HCCA, QoS can be configured with great precision. QoS-enabled stations have the ability to request specific transmission parameters (data rate, jitter, etc.) which should allow advanced applications like VoIP and video streaming to work more effectively on a Wi-Fi network The term "frequency division" as used herein is a method to achieve radio frequency isolation between two RF communications systems or channels by separating the radio frequencies in use by the systems or channels.

The term "co-exist or co-existence" in the context of radio frequency systems, refers to the ability of the radio frequency systems to operate according to their respective specifications without interfering with each other typically by causing noise and/or distortion to each other.

The term "time division" as used herein is a method to achieve co-existence between two RF systems or channels by having the systems or channels operate in different time slots.

(Ref. http://en.wikipedia.org/wiki/IEEE_802.11e)

A known technique used to provided co-existence of different wireless networks is known as "detect and avoid". An example of "detect and avoid" is found in international patent application of Palin et al. (WO/2005/119924) entitled "Method and System for Interference Detection". Palin et al. disclose a wireless communications device in which static interference is detected so that frequencies in use are avoided. The system includes a first receiver configured to receive a first wireless signal (such as a Bluetooth or WLAN signal), and a second receiver configured to receive a second wireless signal (such as a UWB signal). The second receiver is configured to determine spectral characteristics of the first wireless signal. Based on these determined spectral characteristics, an interference detection module identifies interference in the first wireless signal.

SUMMARY OF THE INVENTION

According to the present invention there is provided a system including a radio frequency identification (RFID) network and a wireless local area network (WLAN). The RFID network transfers ultra-wide band signals between a reader and a tag. In the wireless local area network (WLAN) an access point communicates with a WLAN transceiver using WLAN signals, preferably according to a standard of IEEE 802.11. The ultra-wide band signals have a bandwidth exceeding the lesser of five hundred megaHertz or twenty percent center frequency. The reader is operatively attached to either the wireless access point or the WLAN transceiver and the WLAN is the back haul network of the RFID network. Co-existence of the two networks is provided either by time division between the ultra-wide band signals and WLAN signals; and/or receiver isolation of said RFID network from said WLAN signals. Preferably, the time division is provided using a Request to Send (RTS) WLAN (IEEE 802.11) signal, or by the wireless access point which sends beacon frames at regular intervals. The interval between the beacon frames includes a contention period and a contention free period. The ultra wide band signals are broadcast during the content free period. The system preferably includes an RFID server application which manages the RFID network. The RFID server application connects to the RFID network through the WLAN. Alternatively, time division is managed by an RFID server application, connected to the access point through the WLAN. A control command is sent from the RFID server application to the access point, which silences the access point.

Alternatively, the reader includes a medium access controller (MAC) programmed to provide the time division, wherein the MAC is synchronized with transmissions from either the wireless access point or the WLAN transceiver. Receiver isolation is preferably provided by increasing distance between a WLAN antenna connected to the wireless access point from an RFID antenna connected to the reader, by using frequency division between the WLAN signals and the ultra wide band RFID signals, and/or by a radio frequency (RF) filter. The reader and the access point are possibly assembled in a single housing, the reader may be implemented as an expansion card mounted in a mating slot in the access point. The reader preferably includes a digital mechanism which minimizes deleterious effects of interference from the WLAN signals. The digital mechanism preferably includes a programmable notch filter and possibly a burst-error-correcting code and an interleaver.

BRIEF DESCRIPTION OF THE DRAWINGS

The invention is herein described, by way of example only, with reference to the accompanying drawings, wherein:

FIG. 1 is a simplified drawing according to an embodiment of the present invention wherein an RFID reader is integrated with a WLAN client;

FIG. 2 is a simplified drawing according to an embodiment of the present invention wherein an RFID reader is attached to a WLAN access point by a data cable;

FIG. 3 is a simplified drawing according to an embodiment of the present invention of an RFID reader implemented in an expansion slot of a WLAN access point;

FIG. 4 is a simplified drawing, according to an embodiment of the present invention, of an RFID reader incorporating the WLAN access point;

FIG. 5 is a simplified bar graph illustrating time division between ultra wide band RFID signals and WLAN signals;

DESCRIPTION OF THE PREFERRED EMBODIMENTS

Figure 6A:
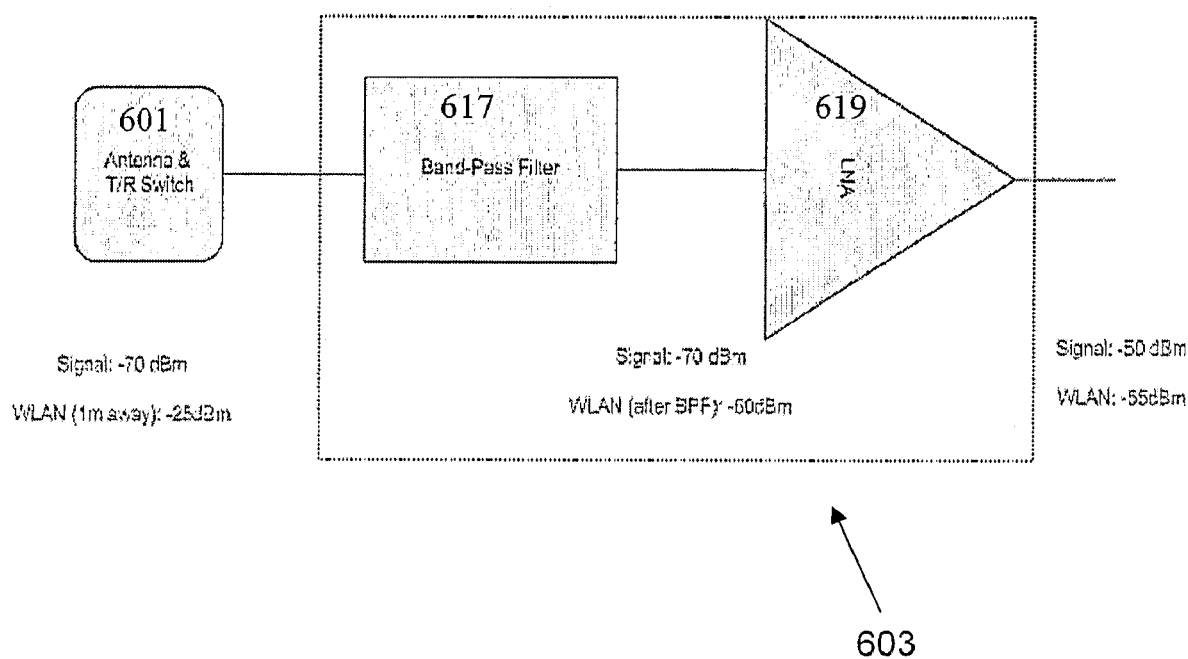
FIG. 6 is a simplified block diagram of an RFID transceiver, according to an the embodiment of FIG. 1.
Figure 7:
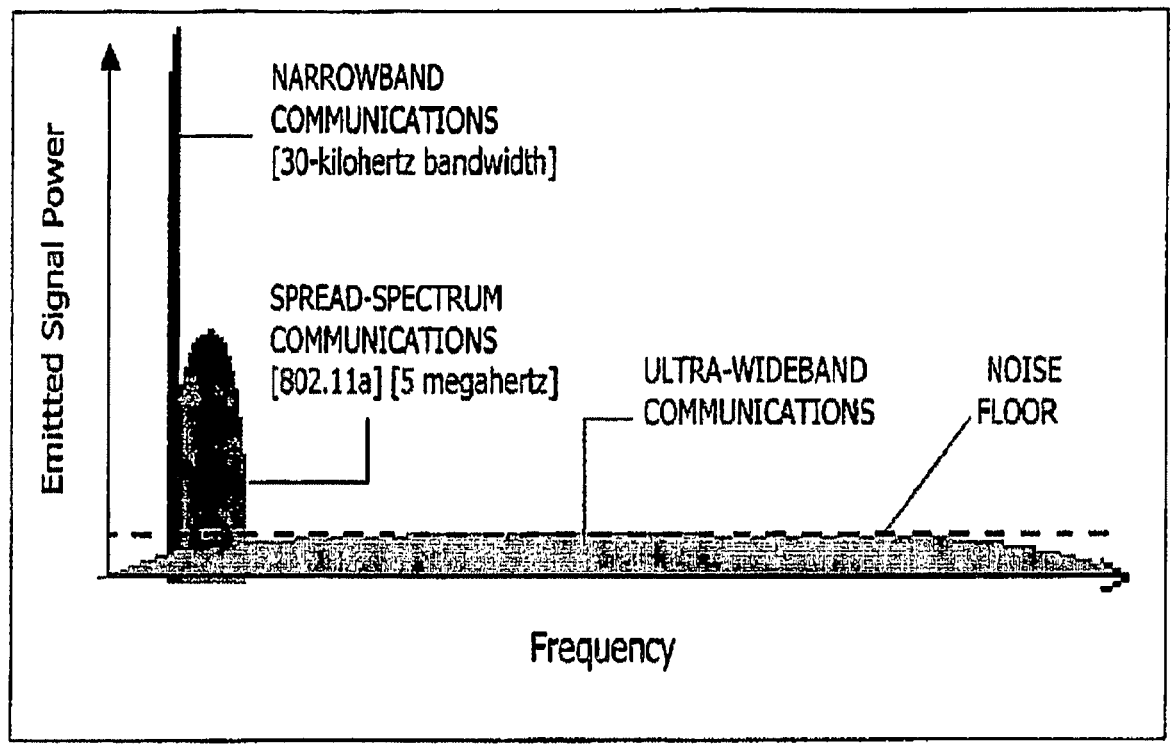
FIG. 7 is a prior art graph showing frequency allocation of different RF signals in the environment of the present invention.

The present invention is of an RFID system including readers and tags, using ultra-wide band (UWB) communications between the readers and the tags, and the RFID system operates without interference from the wireless LAN (WLAN) and transfers (back haul) data with the wireless LAN.

The principles and operation of an RFID system operating and transferring data with a wireless LAN according to the present invention, may be better understood with reference to the drawings and the accompanying description.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

By way of introduction, a principal intention of the present invention is to provide an RFID system based on ultra-wide band signaling which operates without interference in the same space as a wireless LAN, and the RFID system uses the wireless LAN to transfer information to and from the resource management systems of the enterprise. A computer connected via WLAN to the RFID readers may act as an RFID server and perform distance measurement and location determination of tags, according to WO2003/098528. On providing the co-operating RFID system with a WLAN, the WLAN may be used as a bridge between separate RFID systems or to transfer information between two RFID readers, if the readers cannot establish communications because of a large distance between them.

Another intention of the present invention in some embodiments is to insure co-existence of an RFID/UWB system with a wireless LAN without requiring modification to the WLAN. In this way, a previously installed WLAN will not require modification or replacement, compatibility is insured with multiple manufacturers of LAN equipment and intercompatibility with an RFID UWB system need not be specified.

Another intention of the present invention is to reduce cabling infrastructure. A common practice in RFID networks is to connect all RFID readers with data cables to the LAN. The use of a wireless LAN as a back haul to the RFID system greatly reduces cost and logistical complexities of providing data cables to each RFID reader. The RFID readers will nevertheless require power cables unless equipped with a preferably rechargeable battery.

Referring now to the drawings, FIG. 1 illustrates an embodiment 10 of the present invention in which access points 103 are connected to switch 107 to form a wireless LAN. Readers 105 of an ultra-wide band RFID network are placed in the vicinity of the wireless LAN A wireless LAN transceiver, i.e. network interface, is integrated with readers 105, and readers 105 are clients in the wireless LAN network Preferably, access points 103 are optionally previously installed and no modification to access points 103 is required to support the RFID network. Also, each reader 105 is optionally equipped with its own power source, e.g. rechargeable battery so that cabling installation is preferably eliminated. The wireless LAN serves as the communications link between readers 105 to the data infrastructure including for instance an RFID application and/or RFID server.

Reference is now made to FIG. 2, illustrating embodiment 20 of the present invention. Access points 103 as in embodiment 20 do not require any modification. Readers 205 and/or access points 103 are equipped with an Ethernet (e.g. 100 BaseT) interface or hub. Readers 205 are mounted in close vicinity to access points 103, and use the same cabling infrastructure which connect access points 103 to data and optionally to power. Ethernet data cables 211, (e.g. Category 5 twisted pair with RG45 connectors), connect readers 205 to access points 103. Optionally, power is supplied to readers 205 over data cable 211 using "power over Ethernet" technology or with separate power supplies or batteries.

Reference is now made to FIG. 3, illustrating embodiment 30 of the present invention. In embodiment 30, access points 303 are constructed to include an expansion slot. In access point 303, different expansion cards can be used for many different applications, such as smoke detection, providing an auxiliary communications interface, or an input to test equipment. In the context of the present invention, expansion slot receives a UWB reader in the form of an expansion card 305 mounted in expansion slot. In embodiment 30, cabling infrastructure is eliminated, supporting specifically the RFID network.

Reference is now made to FIG. 4, illustrating embodiment 40 of the present invention. In embodiment 40, RFID readers 405 are constructed to implement the WLAN access point 403 functionality so that when the RFID system 40 is installed, for instance if a conventional WLAN is upgraded to RFID system 40, access points 103 are replaced by reader 405 which include access point 403 using the existing cabling infrastructure.

In embodiments of the present invention, an RFID/UWB network is required to co-exist in the same vicinity or space as a wireless LAN. In the wireless LAN, an access point 103,303 transmits a power up to +18 dbm and the RFID ultra wide band receiver has a sensitivity of for instance −80 dbm. In embodiments particularly in which access point 103,303,403 and RFID receiver are in close proximity the RFID receiver may overload whenever the WLAN access point 103,303,403 is transmitting. The presence of WLAN signals is expected to interfere with the reception of ultra-wide band RFID signals causing noise and distortion, i.e. harmonic and intermodulation distortion, especially in embodiments 30 and 40 in which access points 303,403 and RFID readers 305,405 are co-located in the same housing. Consequently, according to embodiments of the present invention, the REID network does not operate, i.e. transmit, while WLAN is transmitting. Reference is now made to FIG. 5 which illustrates schematically as a bar 5 graph different times of operation of WLAN and RFID network respectively. With the use of time division, the interference of RFID signals from WLAN signals is avoided. The use of time division also insures that the UWB transmissions do not affect the WLAN in any way.

In different embodiments of the present invention, time division between WLAN and RFID networks is achieved using an RTS/CTS handshake in the WLAN. For instance, referring back to FIG. 1, in embodiment 10, RFID/UWB reader 105 includes a client of WLAN. RFID reader 105 using the attached WLAN client transmits an RTS packet with a time interval, e.g. 5 milliseconds. Access Point 103 receives the RTS packet and transmits to RFID reader 105 a CTS packet also with the same time interval. All WLAN devices in the vicinity of the WLAN which received either the RTS or CTS packet will not transmit for at least 5 milliseconds during which time RFID reader is free to transmit UWB signals for instance to RFID tags in the vicinity of the LAN and receive UWB signals in response from the tags. As an example, during each time interval to fifty milliseconds, the UWB system needs a window (or several time windows) totaling about 5 msec (on the average), thus by silencing the WLAN only during these windows, the WLAN capacity is reduced by 10%, avoiding interference between the different networks. The UWB system will be non-active during 90% of the time, and not interfere with the WLAN system. The tags in the UWB system 'synchronize' to the active UWB period, transmitting only during the period which is dedicated for the RFID system, and preferably go into 'sleep' mode during the WLAN active time periods in order to save power.

In other embodiments of the present invention, such as embodiment 30 and 40, the RFID/UWB reader 305,405 is integrated with a WLAN access point 303,403. In these embodiments, reader 305,405 is synchronized with transmitting of the access point beacon frames. Access point 303,403 using the timing of the beacon frames reserves at least a part of the contention free period for the use of RFID/UWB network to complete data transfer with the RFID tags.

Using 802.11e enhancements other similar techniques are available to "silence" the WLAN and allow a time interval to the RFID/UWB network to transmit without interference. Under control of access points 103,303,403 a transmit opportunity (TXOP) may be allocated to RFID-UWB network under EDCA. Alternatively, under HCCA, the RFID/UWB network transmits without interference during the "contention free period" wider control of access point 103, 303,403.

In other embodiments of the present invention, access points 103,303,403 may be silenced using a management interface to access points 103,303,403 especially when the RFID/UWB has only sparse traffic. RFID commands, e.g. read tag, locate tag, write to tag, are originated in the RFID server. The RFID server sends a control signal, typically using TCP/IP or UDP/IP signaling to the management interfaces of access points, 103, 303 to silence access points 103, 303 in the vicinity of the broadcasting RFID tags and/or readers 105,205, 305. Access points 103,303,403 are silenced (by brute force) and the RFID server routes the RFID data requests or control commands through the RFID/UWB network. When the acknowledgments and/or data are received by the RFID server from the RFID/tags and/or readers 105, 205,304,405 a control command is sent to access points 103, 303, to allow access points 103, 303, 403 to broadcast again.

Reference is now made to FIGS. 6 and 6a, illustrating a simplified block diagram of reader 105. Reader 105 includes an antenna 601 for both receive and transmit channels. Typically a switch 615 switches between receive and transmit. Receiver RF front end includes a filter 617 and typically a tuned low noise amplifier (LNA) 619 one or more other cascaded RF amplifiers and a frequency down conversion block. Filter 617 is for instance a band pass filter that rejects the WLAN at 2.4 Ghz and 5.2 Ghz, and enables co-existence with the WLAN. Typical signal levels are shown in FIG. 6a of −70 dbm for the RFID UWB signals. Wizen WLAN antenna is one meter distant (such is in embodiments 10, 20) from RFID antenna 601 WLAN signal level peaks at about −25 dbm. This WLAN signal level is further attenuated by filter 617 to for instance −60 dbm. After 25 frequency down conversion the output signal is input to an analog-to-digital converter 605 and the output digital signal is preferably processed digitally in a digital signal processing block 607. Digital signal processing block 607 preferably includes a digital filter and/or other mechanisms for noise/distortion cancellation and error correction which may still remain from the WLAN interference.

On the transmit side, digital signal processing circuitry 607 prepares data for transmission. The data is typically encoded, frequency up converted and transmitted by RF front end 611 to antenna 601 through transmit/receive switch 615. Medium Access Control Processor 609 is connected to a WLAN client or WLAN network interface by a data communications connection. In embodiments of the present invention, the data communications connection from WLAN client 613 to MAC processor is used by MAC processor to determine that WLAN is not transmitting (silent) and RFID signals may be transmitted without interference from the WLAN network. For instance, a time and/or time duration is received by MAC processor 609 over the data communications interface from the WLAN client, based on the time durations of RTS/CTS protocol in the WLAN 5 network.

Note that the MAC (Media Access Control) of the UWB system can be designed for time division between the UWB system and the WLAN system. For example when UWB reader 105,205,305,405 needs to transmit a 'backhaul' data packet using the WLAN network, it will do so only after completing its session of RFID transmit and receive.

Moreover, if the UWB system includes multiple readers 105,205,305,405 they may use a "beacon" system design which guarantees that all the beacon transmissions are synchronized. Thus previously set time slots can be designed to be free from UWB transmission, allowing the readers to use these time-slots for WLAN backhaul messages, without interfering with other readers 105,205,305,405 or other UWB devices.

Another novel idea is based on the fact that the WLAN network can not be silenced for too long intervals, otherwise loss of corrections may occur in the WLAN sessions. Assuming that the UWB network can work with sparse transmissions, the MAC protocol can include a parameter which guarantees that even when reader 105 needs to make a UWB session with several devices, then the transmission of the UWB devices to that reader will be done in "Reply Windows", that are separated by quiet windows. During the reply windows, reader 105 will use RTS/CTS protocol or other mechanism to silence the WLAN near Access point 103, so that RFID/UWB will operate with interference; then, during the UWB-quiet intervals, reader 105 stops transmitting RTS allowing the WLAN network to resume operation. Such time intervals can be of several milliseconds duration, allowing both the WLAN network, as well as the UWB network, to function properly.

As discussed previously, time division is used in embodiments of the present invention to insure that both the WLAN network and RFID network operate with mutual interference. In other embodiments of the present invention, in addition or instead of time division, RF isolation is used, particularly isolation of the RFID/UWB receive path from the transmit channels of the WLAN. As is well known in the art of radio frequency systems, isolation may be achieved by a number of techniques including filtering the UWB receiver to attenuate WLAN transmit frequencies, increasing distance between the WLAN antenna from the RFID antenna such as in embodiments 10 and 20 or in embodiments 30 and 40 by extending one of the antennas away from the other e.g with a 1 meter long coaxial cable. Isolation is improved by proper housing techniques, e.g adding RF shields in embodiments 30 and 40. Isolation is improved by using different, preferably orthogonal antenna polarizations between RFID antenna 601 and the WLAN antenna. Isolation is accomplished through system design by frequency division or separating the WLAN frequency band from the RFID/UWB frequency band. A known practice is to separate the UWB band to "low band" (3.1 Ghz to 4.8 Ghz) and "high band" (above 6 Ghz), and in this way the WLAN frequencies (namely around 2.4 Ghz and 5.2 Ghz) are separable from the UWB bands. A band-pass filter, covering either the UWB low band or high band, at the input of the RF receive front end 603 is to increase isolation and to reduce possible interference from the WLAN transmit band. Furthermore, the UWB receive RF front end 603 is preferably designed with a maximum (spur free) dynamic range in order to minimize the deleterious effects of harmonic and intermodulation distortion from the WLAN transmit channel. Furthermore, as the WLAN signal has a substantially lower bandwidth, e.g. 10-20 Mhz than the UWB signal of bandwidth at least 500 MHz, digital circuit implemented in block 607 implements "narrow band interference rejection" in Reader 105, to reduce deleterious interference effects from WLAN transmissions to UWB reader 105. If the UWB system uses a data rate which is substantially lower than the WLAN data rate, which is often the case, then typically the WLAN packets will be much shorter than the UWB packets. Then, use of a burst-error-correcting code together with an interleaver, as is known in the art of codes designs, can be useful to allow reception even if some WLAN transmission inflict a burst of errors.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

While the invention has been described with respect to a limited number of embodiments, it will be appreciated that many variations, modifications and other applications of the invention may be made.

What is claimed is:

1. A system comprising:
   (a) a radio frequency identification (RFID) network, wherein said RFID network transfers ultra-wide band signals between a reader and a tag;
   (b) a wireless local area network (WLAN) including a wireless access point communicating using a plurality of WLAN signals with a WLAN transceiver, wherein said reader is operatively attached to selectably either said wireless access point or said WLAN transceiver, wherein said WLAN is a back haul network of said RFID network; and
   (c) at least one mechanism which provides a function selected from the group consisting of:
      (i) time division between said ultra-wide band signals and WLAN signals; and
      (ii) receiver isolation of said RFID network from said WLAN signals.

2. The system, according to claim 1, wherein said wireless local area network (WLAN) operates according to a standard of Institute of Electrical and Electronics Engineers (IEEE) 802.11.

3. The system, according to claim 1, wherein said ultra-wide band signals have a bandwidth exceeding the lesser of five hundred megaHertz or twenty percent center frequency.

4. The system, according to claim 1, wherein said time division is provided using a Request to Send (RTS) WLAN signal.

5. The system, according to claim 1, wherein said time division is provided by said wireless access point which sends beacon frames at regular intervals, wherein the interval between said beacon frames includes a contention period and a contention free period, wherein said ultra wide band signals are broadcast solely during said content free period.

6. The system, according to claim 1, further comprising an RFID server application which manages said RFID network, wherein said RFID server application operatively connects to said RFID network through said WLAN.

7. The system, according to claim 1, wherein said time division is managed by an RFID server application, operatively connected to said access point through said WLAN, wherein a control command is sent from said RFID server application to said access point, thereby silencing said access point.

8. The system, according to claim 1, wherein said reader includes a medium access controller (MAC) programmed to provide said time division, wherein said MAC is synchronized with transmissions from selectably either said wireless access point or said WLAN transceiver.

9. The system, according to claim 1, wherein at least a portion of said receiver isolation is provided by increasing distance between a WLAN antenna connected to said wireless access point from an RFID antenna connected to said reader.

10. The system, according to claim 1, wherein at least a portion of said receiver isolation is provided by frequency division between said WLAN and RFID network.

11. The system, according to claim 1, wherein at least a portion of said receiver isolation is provided by a radio frequency filter.

12. The system, according to claim 1, wherein said reader and said access point are assembled in a single housing.

13. The system, according to claim 1, wherein said reader is implemented as an expansion card mounted in a mating slot in said access point.

14. The system, according to claim 1, wherein said reader includes a digital mechanism which minimizes deleterious effects of interference from said WLAN signals.

15. The system, according to claim 14, wherein said digital mechanism includes a burst-error-correcting code and an interleaver.

* * * * *